(12) United States Patent
Stiert

(10) Patent No.: US 7,516,220 B1
(45) Date of Patent: Apr. 7, 2009

(54) METHOD AND SYSTEM FOR DETECTING AND DETERRING ROBOT ACCESS OF WEB-BASED INTERFACES BY USING MINIMUM EXPECTED HUMAN RESPONSE TIME

(75) Inventor: Steven Joseph Stiert, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,265

(22) Filed: May 15, 2008

(51) Int. Cl.
  *G06F 15/16* (2006.01)
  *G06F 12/00* (2006.01)
(52) U.S. Cl. .................... 709/225; 709/203
(58) Field of Classification Search ........... 709/203, 709/217, 218, 223–225, 229, 250
See application file for complete search history.

(56) References Cited

U.S. PATENT DOCUMENTS

| | | |
|---|---|---|
| 6,662,230 B1 | 12/2003 | Eichstaedt et al. |
| 6,681,255 B1 | 1/2004 | Cooper et al. |
| 6,804,701 B2 | 10/2004 | Muret et al. |
| 6,941,368 B1 | 9/2005 | Hamzy et al. |
| 7,107,619 B2 | 9/2006 | Silverman |
| 7,139,916 B2 | 11/2006 | Billingsley et al. |
| 7,185,092 B2 | 2/2007 | Furui et al. |
| 7,197,762 B2 | 3/2007 | Tarquini |
| 7,322,033 B2 * | 1/2008 | Ito .................. 718/104 |
| 2002/0032869 A1 | 3/2002 | Lamberton et al. |
| 2002/0046223 A1 | 4/2002 | Lamberton et al. |
| 2004/0025055 A1 | 2/2004 | Hamadi et al. |
| 2004/0117654 A1 | 6/2004 | Feldman et al. |
| 2004/0143670 A1 | 7/2004 | Roychowdhury et al. |
| 2004/0210589 A1 | 10/2004 | Cooper et al. |
| 2005/0015766 A1 * | 1/2005 | Nash et al. .................. 718/102 |
| 2005/0050364 A1 | 3/2005 | Feng |
| 2005/0065802 A1 | 3/2005 | Rui et al. |
| 2005/0114705 A1 | 5/2005 | Reshef et al. |
| 2006/0277544 A1 * | 12/2006 | Bjoernsen et al. ........... 718/100 |
| 2007/0078983 A1 | 4/2007 | Modrall |
| 2007/0124801 A1 | 5/2007 | Thomas et al. |

(Continued)

OTHER PUBLICATIONS

Rupp, Karl, "How to Fight Guestbook and Comment Spam," http://www.karlrupp.net/en/computer/how_to_fight_guestbook_spam, archived on Jul. 4, 2007 by Internet Archive, retrieved on May 14, 2008 from http://web.archive.org/web/20070704141859/www.karlrupp.net/en/computer/how_to_fight_guestbook_spam, 15 pgs.

*Primary Examiner*—Zarni Maung
(74) *Attorney, Agent, or Firm*—Keusey, Tutunjian & Bitetto, P.C.

(57) ABSTRACT

The present principles provide systems and methods for detecting robot-access of a web-based interface by utilizing a minimum expected human response time (MEHRT) to complete a pre-determined task. After a user is prompted to complete the pre-determined task, a user-response time is calculated. The user-response time is compared to the MEHRT and if the user-response time is less than the MEHRT, then the system determines that the user is a robot. Additionally and/or alternatively, the MEHRT may be employed to impose a time penalty on robots and thereby deter robot access of the interface. The time penalty may be imposed by preventing a user from completing the pre-determined task until the MEHRT has passed.

1 Claim, 6 Drawing Sheets

U.S. PATENT DOCUMENTS

| | | |
|---|---|---|
| 2008/0010642 A1 * | 1/2008 | MacLellan et al. .......... 718/102 |
| 2008/0028463 A1 | 1/2008 | Dagon et al. |
| 2008/0072293 A1 | 3/2008 | D'Urso |
| 2008/0109553 A1 | 5/2008 | Fowler |
| 2008/0198407 A1 * | 8/2008 | Fukudome ................. 358/1.15 |

* cited by examiner

METHOD AND SYSTEM FOR DETECTING AND DETERRING ROBOT ACCESS OF WEB-BASED INTERFACES BY USING MINIMUM EXPECTED HUMAN RESPONSE TIME

BACKGROUND

1. Technical Field

The present invention relates generally to systems and methods for preventing the misuse of web and network resources and more particularly to systems and methods for identifying and/or deterring robot-access of such resources.

2. Description of the Related Art

A common problem associated with maintaining a website is the automated and abusive accessing by computer robots of web page interfaces which are intended for humans. A robot is conventionally known as a program or device that runs automatically without human intervention. One example of an interface attacked by robots includes a form for posting a comment to a guestbook. Because robot accesses can be performed and sustained at much higher rates than humans, robot access can degrade server performance. A common use of robots includes the generation of spam by automating the posting of unwanted information to discussion boards, guestbooks, "contact us" forms and the like. This unwanted information may make the content of the site unusable for its intended purpose or audience and also creates additional maintenance costs for the website administrators who spend time and resources to remedy the problem.

There are a few techniques that are currently employed to detect robots and restrict access to human users.

For example, the most common technique for detecting robot-access is the implementation of Completely Automated Public Turing test to tell Computers and Humans Apart (CAPTCHA) methods. One such method includes requesting that the user type letters presented in a distorted image that is thought to be understandable by humans but not by robots. Although CAPTCHA techniques are effective to some degree, they are not user-friendly, as they interrupt a user's session by requiring the entry of additional information. In some instances, such as when the user has visual deficiencies, valid users are restricted from accessing a web interface unless support processes, such as providing the letters audibly, are implemented. Additionally, as time goes by, robot technologies for overcoming CAPTCHA techniques evolve and render some CAPTCHA systems ineffective in preventing and deterring robot access.

Another problem associated with CAPTCHA systems is that they often notify the user when the submission has failed. One reason for providing such a notification is that a valid user may have accidentally entered the wrong confirmation data. However, doing so permits the creators of robots to either manually or automatically detect the failure, which may lead to an intensified effort to overcome the CAPTCHA system by increasing attacks. For this reason, in many cases, it is desirable to prevent the robot from discovering that it has been detected and, at the same time, avoid the contamination of the intended output of the website interface by blocking the robot submission.

Other techniques for detecting robots include comparing the IP address of a user to a list of IP addresses known to be associated with robots. This technique has several problems because it can block access by valid users who happen to have an IP address on the list. Furthermore, the lists may become ineffective, as robots are known to frequently change their IP addresses.

A solution that does not restrict usability for valid users while providing a high degree of robot-access prevention and deterrence is desirable.

In accordance with one aspect of the present principles, robot-access of a web-based interface may be detected by utilizing a minimum expected human response time (MEHRT). The MEHRT is an indicator of the minimum time utilized by humans to complete a pre-determined task. Because robots commonly act and process information faster than humans, they may be identified by comparing the time it takes a user to complete a predetermined task with the MEHRT.

Thus, in one implementation of the present principles, robot-access of a web-based interface may be identified by, for example: ascertaining a minimum expected human response time to complete a pre-determined task; prompting a user to complete the task in response to user-access of a web-based interface; calculating a user-response time, which is the difference between the time the task is completed and the time the prompt is made; and determining that a user is a robot in response to concluding that the user-response time to complete the pre-determined task is less than the minimum expected human response time.

Identifying robot-access of web-based interfaces by examining the time used to complete a pre-determined task enables accurate robot detection while maintaining ease of use, as discussed more fully below.

In accordance with another implementation of the present principles, robot-access of a web-based interface may be deterred by, for example: ascertaining a MEHRT to complete a pre-determined task; prompting a user to complete the task in response to user-access of a web-based interface; logging the time the prompt is made; and preventing the user from completing the task until the minimum expected human response time has passed to impose a time penalty on robots accessing the web-based interface.

Imposing a time penalty on robots accessing a web-based interface limits the robots' ability to complete the maximal number of submissions in a minimal amount of time and thereby deters robots from accessing the website, as discussed more fully below.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide systems and methods which enable the detection of robot-access of a web-based interface. An aspect of a method in accordance with an implementation of the present principles is based on the fact that the elapsed time used by robots to access a web-based interface is substantially less than a human. Further, time thresholds for an interface, including those needing more input from a user, can be defined and used to differentiate between robot and human access. It should be understood that the term "user," as employed herein, may apply to either a robot or a human.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
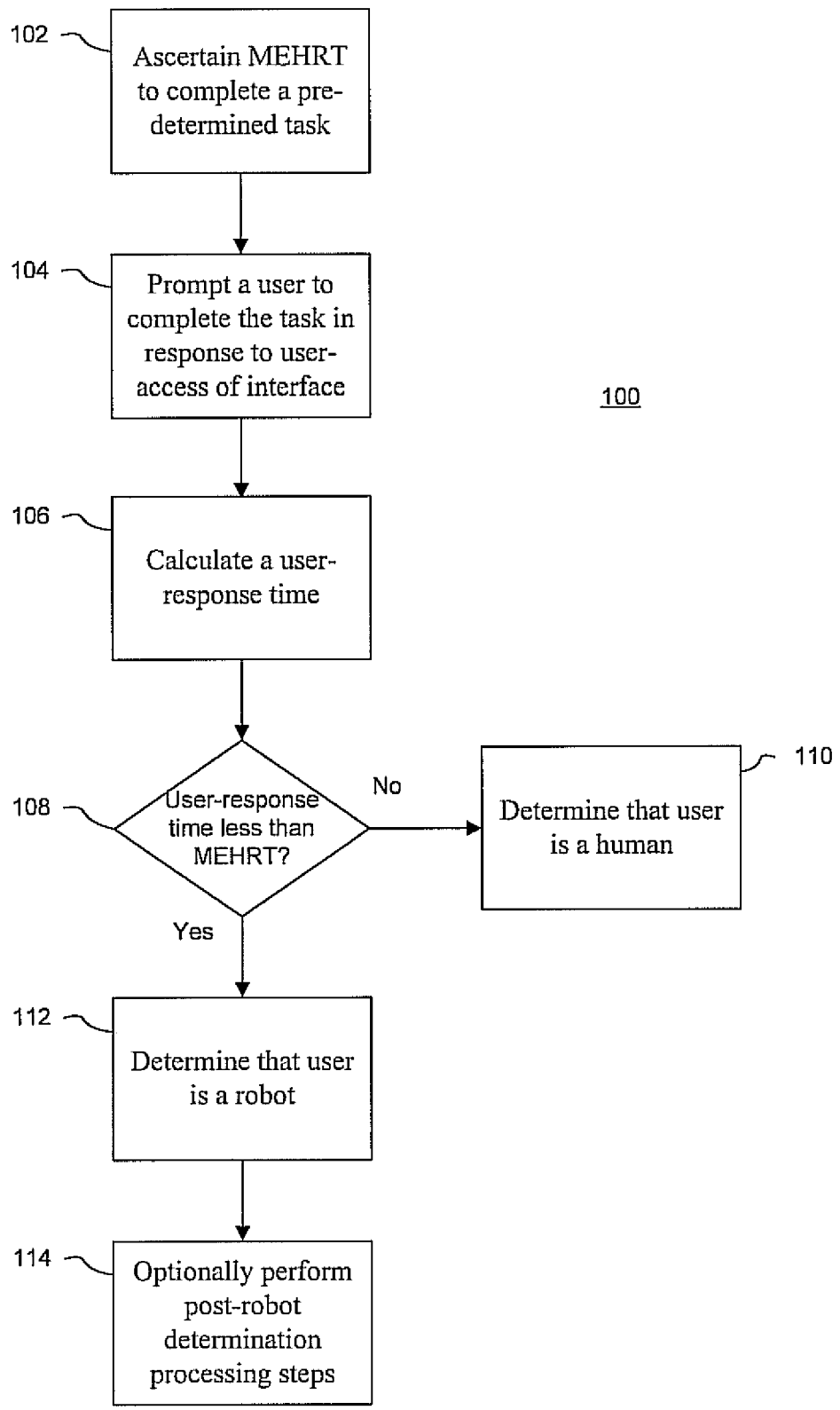
FIG. 1 is a block/flow diagram showing an illustrative example of a method for detecting robot access of an interface in accordance with an aspect of the present principles.

Referring now to the drawings in which like numerals represent the same or similar elements and initially to FIG. 1, a block/flow diagram shows an illustrative method 100 for detecting robot-access of a web-based interface. Method 100 may begin by ascertaining a minimum expected human response time (MEHRT) to complete a pre-determined task in step 102. One example of a pre-determined task may be the completion of online forms, such as those associated with website registrations or guestbooks. Employing a pre-determined task that is already integrated with the intended use of the web-based interface, such as online forms, for example, is advantageous, as ease of use is unaffected or minimally affected by implementing aspects of the present principles.

The MEHRT may be ascertained in a variety of ways. In accordance with one approach, a sample data set of actual begin and end time stamps for completion of a pre-determined task in an interface may be logged and implemented. For example, historical data from completed online forms including beginning and end time stamps may be complied and examined. By reviewing the content of completed forms, forms completed by humans may be differentiated from forms completed by robots. Based on the elapsed times of the sessions determined to be completed by humans, an initial MEHRT may be calculated. In addition, the accuracy of the MEHRT may be improved by fine-tuning as more session data is recorded over time. Once a sufficiently accurate MEHRT is determined, the MEHRT may be stored in a separate file or database for subsequent reference.

In another implementation, one or more MEHRTs with differing ranges of accuracy may be employed. Table 1 provides an example of a set of MEHRTS that may be utilized in accordance with aspects of the present principles.

TABLE 1

| Elapsed Time to complete task | Determination |
| --- | --- |
| 1. Under 10 seconds | Robot-access |
| 2. Between 10 and 30 seconds | Unknown |
| 3. Over 30 seconds | Human-access |

An additional approach includes calculating the MERHT(s) programmatically. Such an approach may include multiplying an average minimum time per input field type by the number of fields of each type and then summing the totals. This approach might be beneficial in situations where an automated approach to calculating the MEHRT is desired and statistically accurate data for automatically calculating these values is available. The pre-determined nature of the task associated with a MEHRT enables the generation of statistically accurate MEHRTs, as conditions under which humans and robots act while accessing the interface are known and may be advantageously configured to yield an accurate MEHRT for improved robot detection.

Returning to FIG. 1, after ascertaining a MEHRT to complete a pre-determined task, the method may proceed to step 104, in which a user is prompted to complete the pre-determined task in response to user-access of a web-based interface. For example, an online form may be displayed to a user in response to user-access of a webpage including the form. In this scenario, the task comprises completing the online form.

At step 106, a user-response time is calculated. The user-response time is the difference between the time the task is completed and the time the prompt is made. A method 200 depicted in FIG. 2 provides an illustrative example of how a user-response time may be calculated.

Figure 2:
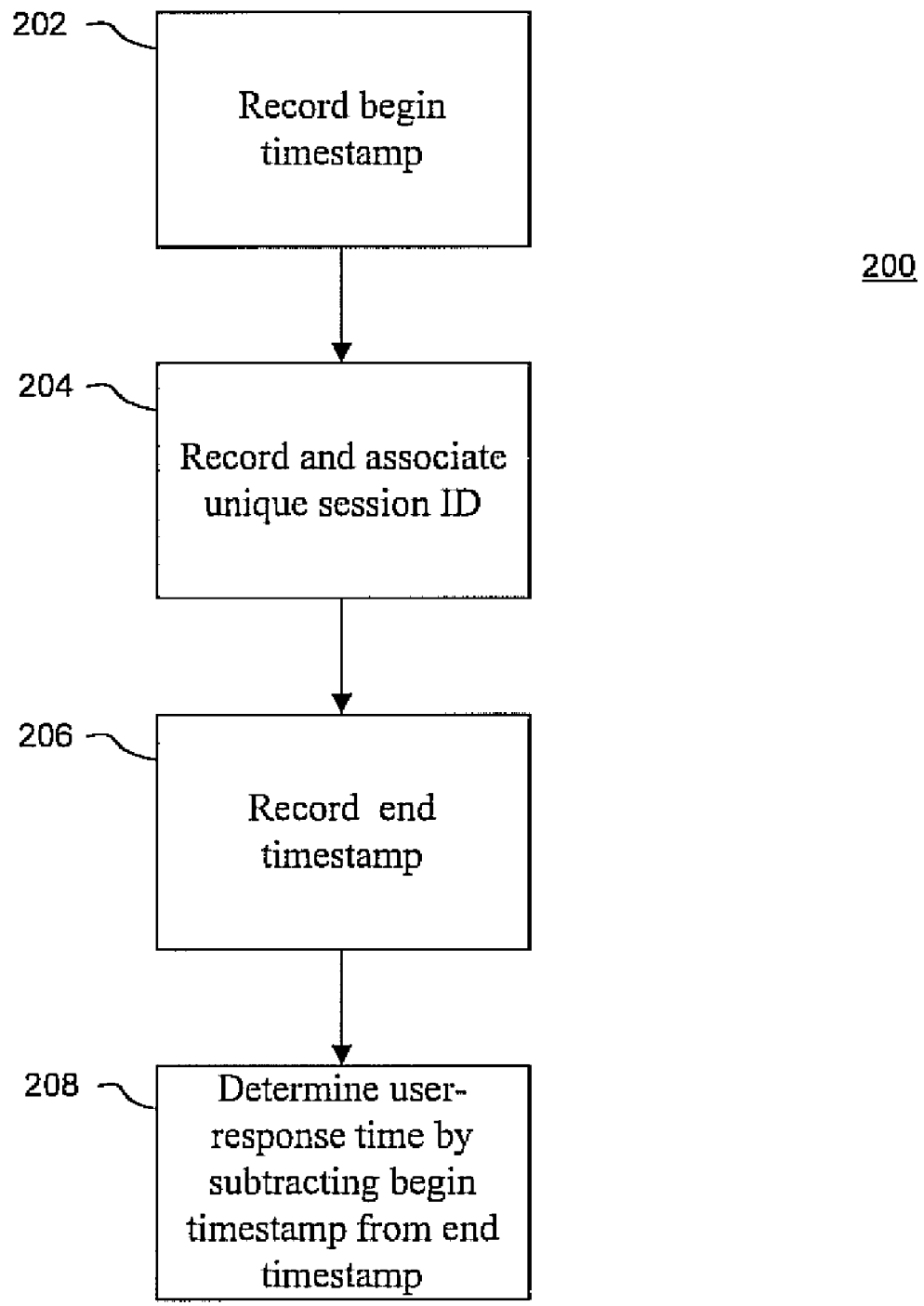
FIG. 2 is a block/flow diagram showing a method for calculating a MEHRT in accordance with an illustrative implementation of the present principles.

Referring now to FIG. 2, a user-response time may be calculated by logging begin and end timestamps. In step 202, a begin timestamp is recorded. Begin and end timestamps may, for example, be determined by referencing server logs. Further, a begin timestamp may correspond to the time in which the particular instance of the web interface is first presented to the user. The actual timestamp may be recorded where it is not visible in the web page presented to the user. In some instances, if the actual timestamp is presented in the webpage, such as via a hidden variable, creators of robots may be able to calculate how to replace this timestamp with a value which circumvents robot detection.

At step 204, a unique session ID is associated with the begin timestamp and is recorded. The session ID is mapped to that timestamp and may be in or associated with the webpage. Thereafter, at step 206, an end timestamp is recorded. The end timestamp indicates the time when the user completes the predetermined task and is also associated with the unique session ID. The user-response time, or, equivalently, the elapsed time spent by the user to complete the task may be determined, in step 208, by subtracting the begin timestamp from the end timestamp. The begin and end timestamps may be retrieved from a log by referencing the session ID.

Returning to FIG. 1, in step 108, it is determined whether the user-response time to complete the pre-determined task is less than the MEHRT(s). The MEHRT(s) may, for example, be retrieved from a separate file or database, as described above. If the user-response time is greater than or equal to the MEHRT(s), then it is determined, in step 110, that the user is a human and normal processing may continue. If the user-response time is less than the MEHRT(s), then, in step 112, it is determined that the user is a robot and that a robot has accessed the interface.

After determining that the user is a robot, one or more optional post-robot determination processing steps, 114, may be implemented. Indeed, which actions are taken after determining whether a user is a robot or a human may be decided by the implementer of the method 100 and can vary based on the circumstances and the relative accuracy of the MEHRT(s).

One possible action may include terminating processing of a robot's submission with no clear indication to the user that the submission was rejected. Because the detection can be done secretly, there is no need to notify the user of the detection. An advantage of not notifying the user may be that it provides no immediate indication to the creator of the robot that the process failed, which could, otherwise, cause the creator or robot to increase attacks on a website.

Another possible action includes the termination of processing of a robot's submission with a warning or error message presented to the user. In cases where the MEHRT cannot be determined with accuracy, a warning would provide an indication to a valid human user of the problem and could possibly suggest a remedy.

Additionally, an action may include processing the submission and storing it in a pending or held queue for examination before final acceptance.

In another action, the processing of the submission may be completed and the session may be flagged as a possible robot submission for follow-up by the website administrator. Such a follow-up may include fine-tuning of the MEHRT, as discussed above. Moreover, critical information about a session, such as the actual elapsed time, the MEHRT, the user's IP address, and key data fields submitted may be logged. This information may also be used to fine-tune the MEHRT. Complementary robot or spam detection techniques may also utilize this information as well.

It should be noted that the method 100 may be well-suited for interfaces which are not trivial and include tasks with a completion time that enables a clear definition of a robot/human time threshold. Such a threshold may be between 30 and 60 seconds.

Figure 6:
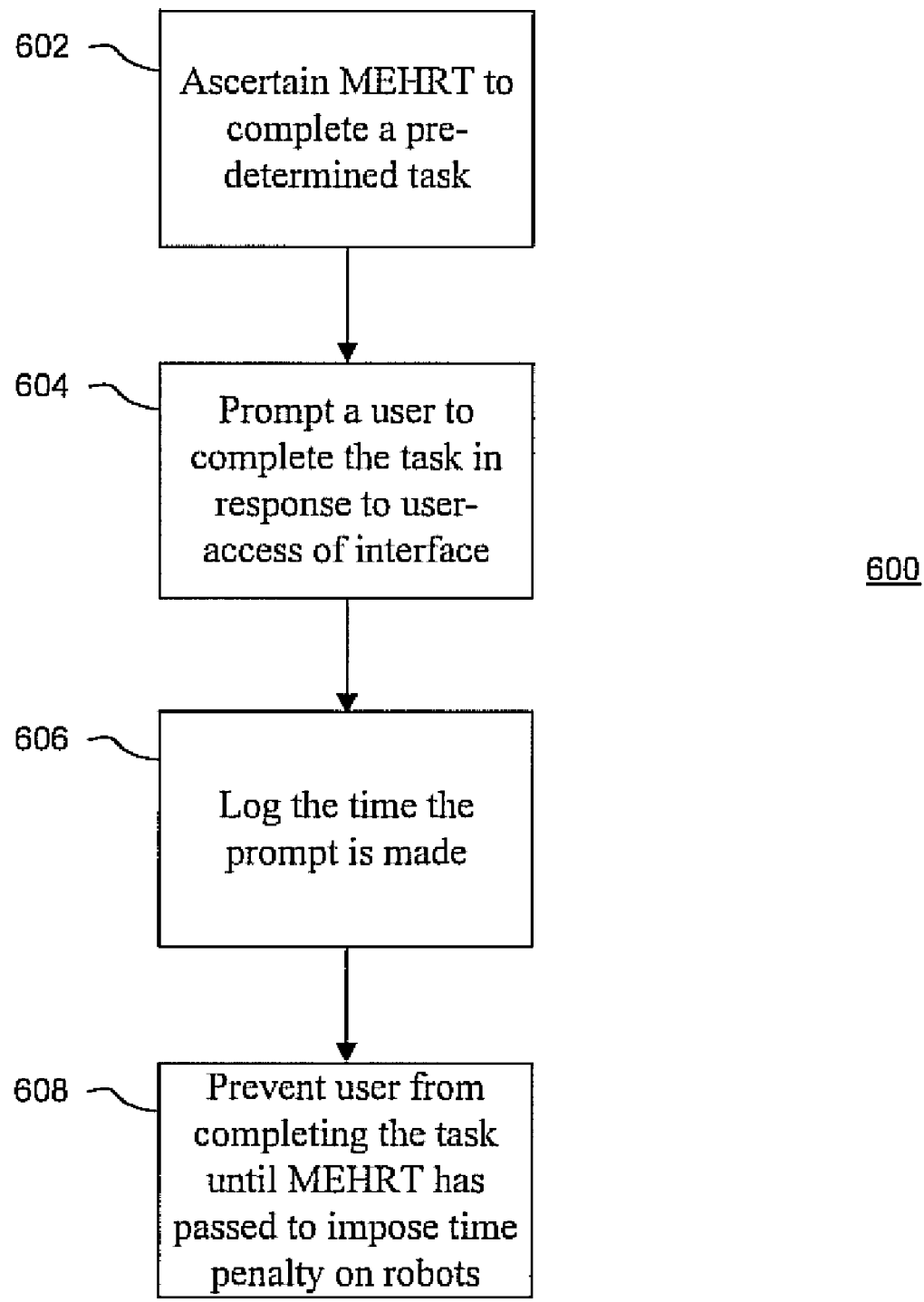
FIG. 6 is a block/flow diagram showing a method for deterring robot-access of a web-based interface.

With reference to FIG. 6, additionally and/or alternatively to the method 100, the MEHRT may also be "imposed" on an interface in accordance with a method 600 for deterring robot access of a web-based interface. For example, a restriction on an interface may be imposed such that the MEHRT must elapse before the interface can be completed and/or the pre-determined task can be submitted. If the MEHRT has been projected accurately, requiring this time to pass before allowing the completion of the interface would not have an impact on a human user, but would impose a time penalty on a robot. At a minimum, the imposition would slow down the number of attempts completed by a robot and, as a result, limit the consequences to the website of any successful attempts. Moreover, the imposition may also possibly discourage further attacks, as it limits one of the primary advantages of the robot, which is to complete the maximal number of submissions in a minimal amount of time. The effectiveness of the deterrence may be further enhanced by widespread use of such a time penalty by several web-interface providers.

The method 600 may begin at step 602 by ascertaining a MEHRT to complete a pre-determined task, as described above with respect to step 102. At step 604, a user may be prompted to complete the predetermined task in response to user-access of a web-based interface, as described above with respect to step 104. As discussed above, the user may be prompted to complete an online form or any other type of task. At step 606, the time the prompt is made may be logged, as described above, for example, with respect to FIG. 2.

At step 608, a user may be prevented from completing the task until the MEHRT has passed to impose a time penalty on robots accessing the web-based interface, as stated above. For example, the user may be prevented from selecting a "submit this form" button until the MEHRT has passed. Further, as discussed above, the MEHRT may correspond to MEHRTs of varying accuracy, such as a MEHRT that definitely indicates robot-access, a MEHRT that definitely indicates human access, or a MEHRT that may indicate either robot-access or human-access, as discussed above with respect to Table 1. Any one or more of these types of MEHRTs may be implemented with method 600 to deter robot-access of an interface. Moreover, it should also be understood that any one or more of steps discussed with respect to method 100 and method 300, discussed below, may be combined with method 600.

Figure 3:
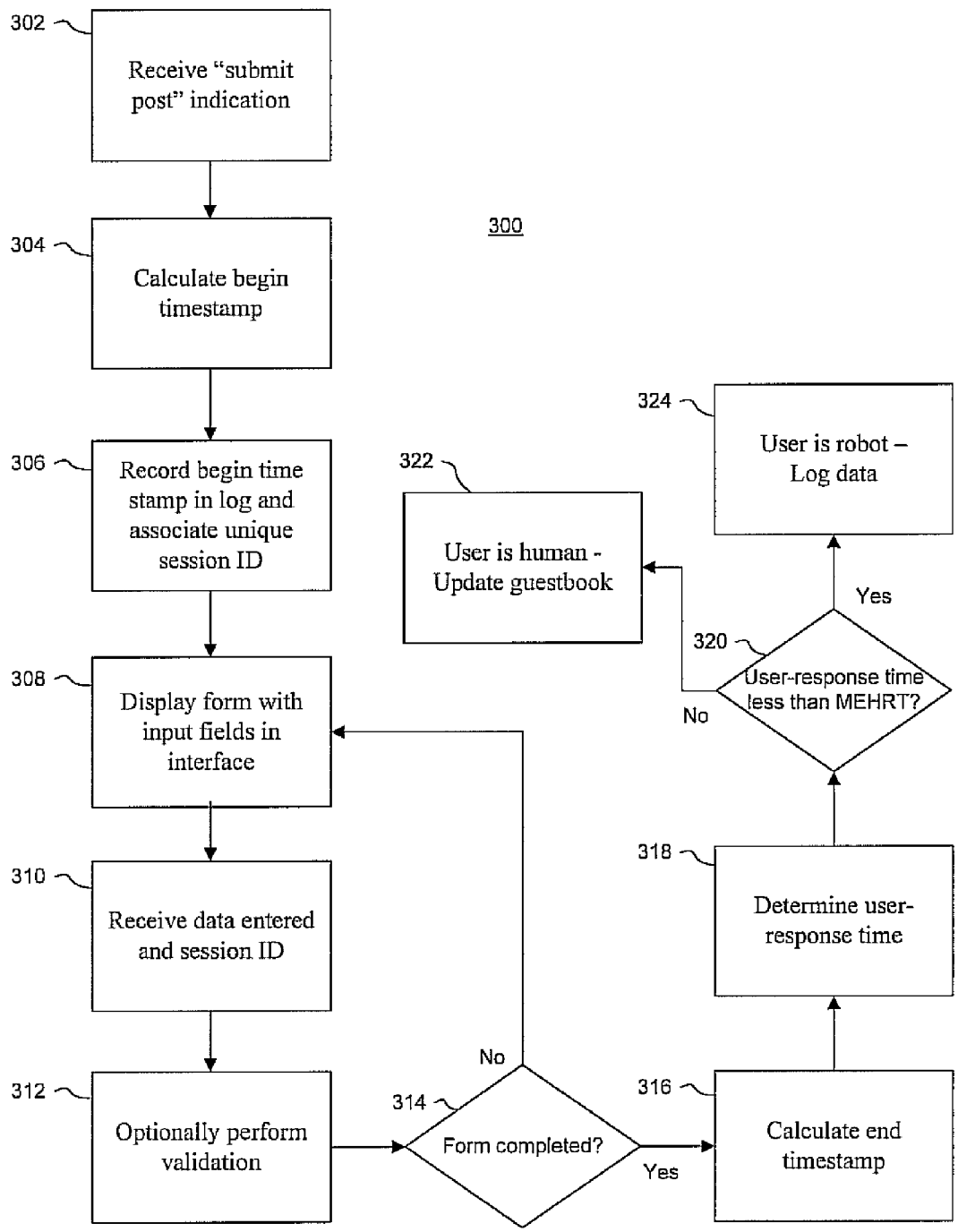
FIG. 3 is a block/flow diagram showing a method for calculating a MEHRT in accordance with an illustrative implementation of the present principles.

With reference to FIG. 3, one illustrative example of an interface in which aspects of the present principles may be implemented include a web-based form used to submit posts to a guestbook. For example, the form may include entries for four pieces of information: the poster's name; the poster's email; a subject line for the post; and the text of the comment. The form may be processed by a Common Gateway Interface (CGI) application named guestbook.pl. The application may be written in Perl or in any other suitable CGI programming language. In this particular scenario, a notification that a robot has been detected will not be provided to the user. After detecting a robot, the post will simply not be added to the guestbook.

FIG. 3 describes an illustrative method 300 for detecting robot-access of an interface by employing such an online form. The method may begin in step 302, in which a "submit post" indication is received. The "submit post" indication may be received in response to user-selection of a "submit a post" link on the guestbook page. Selection of the link may invoke the guestbook.pl application, which dynamically generates the "Post to the Guestbook" form. Thereafter, in step 304, the guestbook.pl script calculates the begin timestamp, which is the exact time that it is invoked to generate the page. At step 306, the application records the begin timestamp in a log or database that is not publicly accessible and associates a unique session ID with the begin timestamp. The guestbook.pl script displays, at step 308, for the user the form including input fields for the form's four entries, a "submit this post" button, and an input variable of type hidden which includes the value of the session ID.

After the user completes the form and selects the "submit this post" button, the data entered and the session ID is received by the guestbook.pl program at step 310 for processing. The guestbook.pl program may then optionally perform any validation of the input data at step 312. In step 314, the application determines whether the form was completed. If the from is incomplete, then the form is re-displayed with the same session ID at step 308. Otherwise, the application determines that the user has completed the interface and proceeds to step 316 in which an "end" timestamp is calculated.

Using the session ID, the begin timestamp is retrieved from the log or database and compared with the end timestamp to determine the elapsed time in step 318. The elapsed time is compared against the MEHRT in step 320 to determine if the user is a robot or human. The MEHRT in this scenario may be hard-coded into guestbook.pl. If a human, the guestbook database is updated in step 322 with the contents of the post and a "your post has been submitted" response is displayed to the user. If a robot, the database is not updated with the contents of the post and a "your post has been submitted" response is still displayed to the user. Instead of being written to the guestbook, the data is logged in step 324 for any follow-up analysis and/or verification, if appropriate.

It should be understood that the method steps may be varied in response to a robot's unconventional access of a webpage. For example, the robot may not first invoke guestbook.pl in such a manner as to display the "Post to the Guestbook" form. The robot may skip that state and directly invoke the application as if it had selected the "submit this post" button. In this scenario, the robot may not have provided a correct session ID or it may have provided a session ID for which a corresponding begin timestamp was never generated. In response, the guestbook.pl may also verify that a valid session ID and timestamp was provided. If the session ID is not valid, the post is determined to be a robot.

An additional scenario may include a robot invoking guestbook.pl to display the "Post to the Guestbook" form and causing a valid session ID and begin timestamp to be generated. Thereafter the robot may reuse this information to repeatedly invoke guestbook.pl as if it had selected on the "submit your post" button. In this case, guestbook.pl may be configured to recognize when a session ID has been previously submitted and reject each subsequent post attempt. It should be noted that this scenario may also be caused by a valid user who has accidentally "reloaded/refreshed" the page causing the same data to be resubmitted. In this situation, the net result to guestbook.pl is the same, as the post would not be accepted. However, the reason-codes associated with this type of failure may be adapted to indicate that this type of user is not necessarily a robot.

Further it should also be noted that other variations to the guestbook implementation described above could be made. For example, the functions implementing method 300 could reside in a common library accessible to all CGI applications and not be hard-coded into the guestbook.pl script. Additionally, the initial web page form need not be dynamically generated. The begin timestamp and session ID may be generated by a server-side include program inserted into a static web page form.

Figure 4:
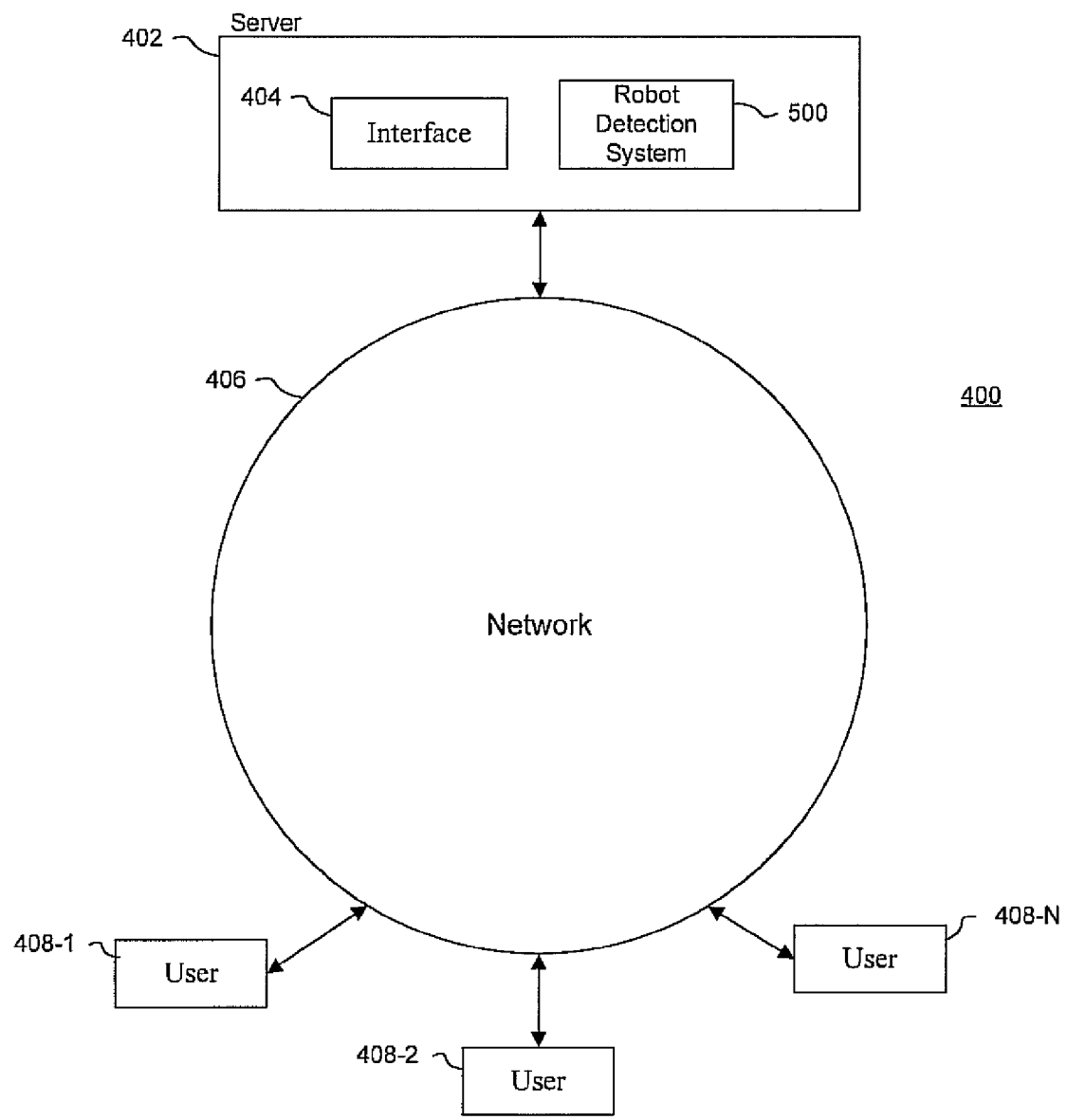
FIG. 4 is a block/flow diagram showing an illustrative example of a system for detecting robot access of an interface in accordance with an aspect of the present principles.

Referring now to FIG. 4, an exemplary system implementation 400 of the present principles is illustrated. The system may include, for example, a server 402 including an interface 404 and a Robot Detection System 500, described more fully below. The interface 404 may comprise, for example, a website, a webpage, and/or a portion of a webpage, such as an online form. The server 402 may be connected to a network 406 through which a plurality of users 408 may access the server 402 and the interface 404. The network 406 may be, for example, the internet and/or a local area network, and the users 408 may comprise computer devices controlled by humans and/or robots.

Figure 5:
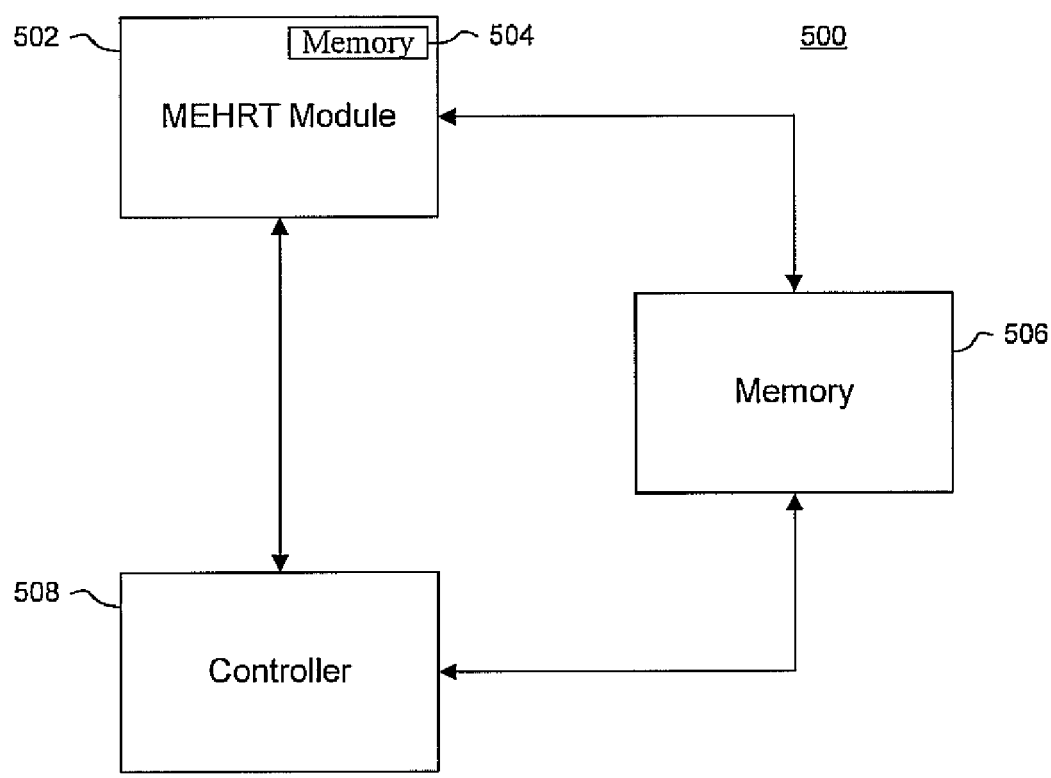
FIG. 5 is a block/flow diagram showing a robot detection system in accordance with an illustrative implementation of the present principles.

Referring to FIG. 5, as stated above, the server 402 may include a Robot Detection System 500 comprising a MEHRT Module 502, a memory 506, and a controller 508. The MEHRT module may include its own memory 504 for storing data received and compiled by the server to generate MEHRT values, as discussed above. For example, the MEHRT Module 502 may be configured to perform step 102 and/or step 602, discussed above, which may include employing historical data from completed predetermined tasks, stored in memory 504, to differentiate human data from robot data and to compute MEHRT values. Further, the MEHRT may be configured to fine tune MEHRT values as more session data is compiled over time and/or to calculate MEHRTs programmatically, as discussed above.

The controller 508 may obtain MEHRT values from the MEHRT module 502 to determine whether one or more particular users are robots and the controller 508 may in turn provide additional session data to the MEHRT Module 502. The controller 508 may determine whether a user 408 accessing an interface 404 is a robot by employing any one or more aspects of the present principles, including implementations discussed at length above. For example, the controller 508 may be configured to perform any one or more of steps 104-114, 202-208, and 302-324, as discussed above. Furthermore, the controller 508 may be configured to perform steps 604-608, discussed above, as well. Additionally, memory 504 may be employed to cooperate with the controller 508 by providing any storage functions utilized by the controller 508. For example, session data such as begin and end timestamps, session IDs and data submitted by users may be stored in and retrieved from memory 504.

Having described preferred embodiments of a system and method for detecting robot-access of a web-based interface (which are intended to be illustrative and not limiting), it is noted that modifications and variations can be made by persons skilled in the art in light of the above teachings. For example, the methods and systems disclosed herein may be applied to any interface that is intended to be accessed manually by a human but for which the ability exists to automate access via a software or even hardware robot. Such examples may include an automated phone response systems, with which a user listens to options and speaks or selects the phone's buttons, credit card terminal applications where numbers are manually entered, and others.

It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for deterring robot-access of a web-based interface comprising:
ascertaining a minimum expected human response time to complete a pre-determined task;
prompting a user to complete the task in response to user-access of a web-based interface; and
preventing the user from completing the task until the minimum expected human response time has passed from the time the prompt is made to impose a time penalty on robots accessing the web-based interface.

* * * * *